United States Patent
Wang et al.

(10) Patent No.: US 11,526,496 B2
(45) Date of Patent: Dec. 13, 2022

(54) DISTRIBUTED DATABASE ARCHITECTURE BASED ON SHARED MEMORY AND MULTI-PROCESS AND IMPLEMENTATION METHOD THEREOF

(71) Applicant: Guizhou Esgyn Information Technology Co., Ltd., Guiyang (CN)

(72) Inventors: Xiaozhong Wang, Guiyang (CN); Xianliang Ji, Guiyang (CN); Zhenxing He, Guiyang (CN); Yingshuai Li, Guiyang (CN)

(73) Assignee: GUIZHOU ESGYN INFORMATION TECHNOLOGY CO., LTD., Guiyang (CN)

( * ) Notice: Subject to any disclaimer, the term of this patent is extended or adjusted under 35 U.S.C. 154(b) by 187 days.

(21) Appl. No.: 17/073,420

(22) Filed: Oct. 19, 2020

(65) Prior Publication Data
US 2022/0043805 A1 Feb. 10, 2022

(30) Foreign Application Priority Data
Aug. 4, 2020 (CN) .......................... 202010772287.5

(51) Int. Cl.
*G06F 9/46* (2006.01)
*G06F 16/23* (2019.01)
*G06F 16/27* (2019.01)
*G06F 16/2455* (2019.01)
*G06F 9/48* (2006.01)

(52) U.S. Cl.
CPC .......... *G06F 16/2379* (2019.01); *G06F 9/485* (2013.01); *G06F 16/24552* (2019.01); *G06F 16/27* (2019.01); *G06F 9/4881* (2013.01)

(58) Field of Classification Search
CPC ..... G06F 16/2379; G06F 9/485; G06F 9/4881
See application file for complete search history.

(56) References Cited

U.S. PATENT DOCUMENTS

| | | | |
|---|---|---|---|
| 2003/0112274 A1* | 6/2003 | Gao ................... | G06F 16/9577 707/E17.121 |
| 2022/0083610 A1* | 3/2022 | Gilliam ................. | G06Q 30/02 |

OTHER PUBLICATIONS

Fragkiskos Pentaris, Yannis Ioannidis; Query optimization in distributed networks of autonomous database systems; vol. 31Issue 2 Jun. 2006 pp. 537.*

(Continued)

*Primary Examiner* — Camquy Truong
(74) *Attorney, Agent, or Firm* — Bayramoglu Law Offices LLC

(57) ABSTRACT

A distributed database architecture based on shared memory and multi-process includes a distributed database node. A system shared memory unit and a system process unit are built in a distributed database. The system shared memory unit includes a task stack information module and a shared cache module. A plurality of process tasks are built in the task stack information module. The process tasks include system information with various purposes in system process task information, and each system information corresponds to one process task. By using a system shared memory unit at a distributed database node, the number of user connections in the distributed database architecture does not have a corresponding relationship with the number of processes or threads. The number of processes or threads of the entire node does not increase as the number of user connections increases.

15 Claims, 2 Drawing Sheets

(56) References Cited

OTHER PUBLICATIONS

Ed Pollack; Methods to Insert Data into SQL Server; Apr. 10, 2019.*

* cited by examiner

DISTRIBUTED DATABASE ARCHITECTURE BASED ON SHARED MEMORY AND MULTI-PROCESS AND IMPLEMENTATION METHOD THEREOF

CROSS REFERENCE TO THE RELATED APPLICATIONS

This application is based upon and claims priority to Chinese Patent Application No. 202010772287.5, filed on Aug. 4, 2020, the entire contents of which are incorporated herein by reference.

TECHNICAL FIELD

The present invention relates to a distributed database architecture, and more particularly, to a distributed database architecture based on shared memory and multi-process and an implementation method thereof.

BACKGROUND

At present, application programs that require a substantial number of processes and functions to operate concurrently are basically realized by connecting middleware. The connection of middleware requires significant analysis and merging processing. User query requests are first analyzed and then distributed to corresponding stand-alone databases for processing, and the query results are first merged and then sent to the previous application program. As a result, the middleware has a performance bottleneck. In order to solve this problem, the middleware must also be designed into a distributed system, which leads to a distributed architecture system at each layer.

Distributed architecture complicates matters and presents numerous problems to systems managers and maintenance personnel and taxes resources. To further complicate matters, current database technologies already develop distributed architecture. A distributed database can thus increase the complexity of application development and, at the same time, significantly increase the number of connections capable of being supported. Although the distributed middleware and the distributed database can solve the problem of high concurrency, since both the middleware and database are distributed systems, they may greatly increase the circulation time of the followed requests and data in the application system, and lead to an increased response time. A feasible solution is to improve the concurrency support capability of the distributed database and remove the distributed middleware, to reduce circulation procedures and response time.

However, the support of a distributed database is necessary irrespective of the type of architecture the application program is based upon. At present, the support for the high concurrency necessarily requires the distributed database. The distributed database architecture in the prior art is implemented based on either independent multi-process or independent multi-thread. These two implementation mechanisms have several shortcomings. Multiple processes or threads are switched in a unit of time slice of the operating system, and the excessive processes or threads result in the substantial expense associated with switching, thereby causing serious performance degradation of the system.

By performing tests on current mainstream systems, such as the Linux system, it has been determined that, when the number of created processes or threads approaches 1,000 on a busy system, the speed of creating threads or processes, intuitively, is slower and slower. Therefore, the above distributed database node architecture based on multi-thread still has the following problems: (1) the abnormality of one connection of a node affects all other connections of the node; (2) one node is only capable of supporting thousands of connections and is difficult to support tens of thousands of connections; and (3) the multi-thread architecture cannot control resources used by a user, especially CPU resource. Therefore, it is highly desirable to provide an improved architecture of such a distributed database system.

SUMMARY

With respect to the above shortcomings, an object of the present invention is to provide an improved distributed database architecture based on shared memory and multi-process and an implementation method thereof. Such an improved architecture should be capable of solving the technical problems in the prior art, that is, the abnormality of one connection of a node in homogeneous databases affects all other connections of the node, and the maximum number of connections supported by the node is limited.

In order to solve the above technical problems, the present invention adopts the following technical solution.

One aspect of the present invention provides a distributed database architecture based on shared memory and multi-process, and the distributed database architecture includes a distributed database node. A system shared memory unit and a system process unit are built in a distributed database. The system shared memory unit includes a task stack information module and a shared cache module. A plurality of process tasks are built in the task stack information module. The process tasks include system information with various purposes in system process task information, and each system information corresponds to one process task. Each system information further includes process tasks associated with all user connection information. The process task includes corresponding stack information and register information. The shared cache module is configured to save a plurality of connections of the distributed database node, or shared information required by each process. The system process unit includes a connection processing process, an execution process, a distributed transaction processing process and a network connection process. Each process in the system process unit loads and executes the process task in the task stack information module, or performs a switching between the plurality of process tasks. The connection processing process is configured to execute a query request, an insert request, an update request and a delete request sent by a client. The execution process is configured to execute a concurrent execution process task derived from the connection processing process. The distributed transaction processing process is configured to execute a distributed transaction processing task, and the network connection process is configured to execute a network connection task.

Preferably, a further technical solution is: a plurality of distributed database nodes are arranged. An internal architecture of each distributed database node is identical, and the system shared memory unit of each distributed database node is allocated and used uniformly by a system.

A further technical solution is: the system process task information is divided into different system information according to different purposes, and includes at least lock processing system information, resource cleaning system information, network processing system information and other system information.

A further technical solution is: the shared information required by each process saved in the shared cache module includes a data dictionary, a configuration parameter, a query plan, a query result, an execution state and stored data.

A further technical solution is: the shared information required by each process saved in the shared cache module is loaded when the system is activated, and is identical to information in a storage layer during an execution of the system.

Another aspect of the present invention further provides a method for implementing the above distributed database architecture, and the method includes the following steps:

step A: performing an activation on a system, allocating and initializing the system shared memory unit in the distributed database node, and initializing all user connection information and the system process task information in the system shared memory unit, the stack information and the register information in the process task, and information in the shared cache module; if a memory is already allocated at this time, reporting errors of the system and the activation;

step B: obtaining a process task required to be executed from the task stack information module by each process in the system process unit, and if no task is obtained, executing an idle task; when the client initiates a connection request, receiving and responding to a user request by the connection processing process in the system process unit, generating a process task corresponding to the current user request by the connection processing process and putting the process task corresponding to the current user request into all user connection information in a shared memory; and step C: when any one process in the system process unit executes any one process task in the task stack information module, a blocking wait occurring, and abandoning, by a current process, an execution of a current process task and handing over the process task to a background process for asynchronous wait.

Preferably, a further technical solution is: in step B, if a user initiates a client connection request, the connection processing process creates user connection information and associates the user connection information with one process task, and then puts the generated process task into all user connection information; if the user initiates a client query request, the connection processing process adds query request information to user connection information associated with a corresponding process task.

A further technical solution is: the method further includes:

step D: cyclically obtaining and executing a process task from the task stack information module by each process in the system process unit; when a process task with user information is executed, further checking whether the user information is a user connection request, and if the user information is the user connection request, executing, by the connection processing process, a flow related to a connection creating, and creating user connection information; if the user information is user query information, obtaining, by the execution process, a user query statement from the user information and executing a related query.

A further technical solution is: the method further includes:

step E: when the system is shut down, first shutting down all processing processes, and then releasing shared memory resource of the system shared memory unit of each distributed database node by one process.

Compared with the prior art, the present invention has the following advantages. By using a system shared memory unit at a distributed database node, the number of user connections in the distributed database architecture does not have a corresponding relationship with the number of processes or threads. The number of processes or threads of the entire node does not increase as the number of user connections increases, thereby effectively avoiding the slowdown of the system response speed due to the excessive number of instantaneous user connections and preventing the system performance from being affected in such case. Meanwhile, the distributed database architecture based on shared memory and multi-process provided by the present invention is simple and easy, and is especially suitable for a distributed database with a large number of instantaneous connections as e-commerce.

DETAILED DESCRIPTION OF THE EMBODIMENTS

The present invention is further described below with reference to the drawings.

In order to solve the above-mentioned shortcomings of homogeneous distributed databases, after research and design, the inventor proposes a distributed database node architecture based on shared memory and multi-process to support high concurrency. The architecture mainly uses a shared memory technology to solve the problem that the cache cannot be shared, and uses a multi-process technology to solve the problem that many connections cannot be used due to the abnormality of one connection. All nodes in the distributed database employs an identical architecture without requiring an independent design. The overall architecture of the distributed database node based on shared memory and multi-process in this technical solution is shown in FIG. 1.

Figure 1:
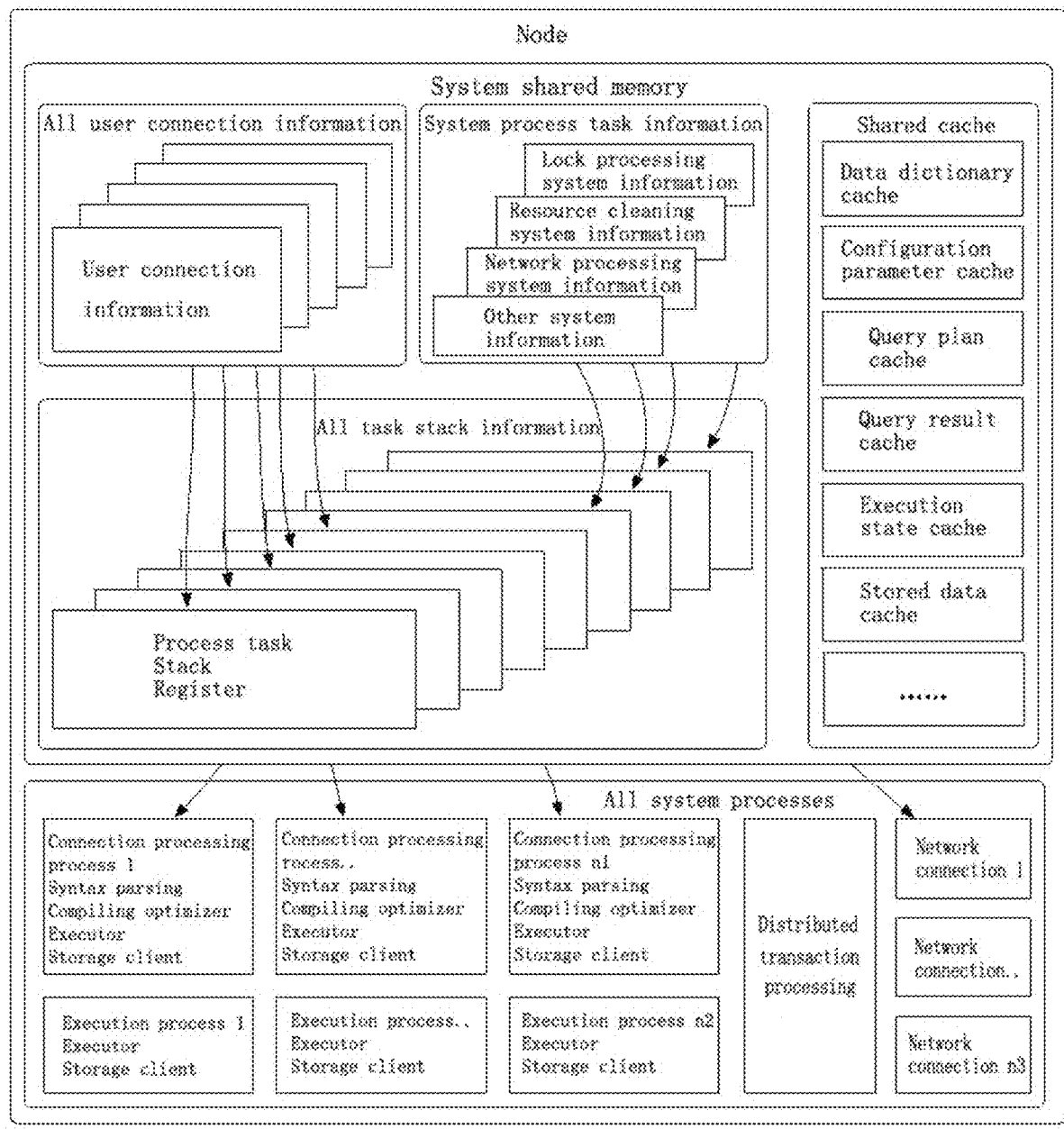
FIG. 1 is a schematic block diagram for explaining a distributed database node architecture according to an embodiment of the present invention.

As shown in FIG. 1, according to an embodiment of the present invention, a distributed database architecture based on shared memory and multi-process includes a distributed database node. A system shared memory unit and a system process unit are built in a plurality of distributed databases.

The system shared memory unit includes a task stack information module and a shared cache module. Specifically, a plurality of process tasks are built in the task stack information module. The process tasks include system information with various purposes in the system process task information, and each system information corresponds to one process task. Each system information further includes process tasks associated with all user connection information. The process task includes corresponding stack information and register information. The shared cache module is configured to save a plurality of connections of the distributed database node, or shared information required by each process. The shared information mainly includes a data dictionary, a configuration parameter, a query plan, a query result, an execution state, and stored data.

The process task associated with the user connection information is to create a shared memory for the user's connection request, which is used to save the user connection information. All user connection information on the node is managed uniformly. Each connection information creates a corresponding process task, and stack information, register information and other related information currently executed by each process are recorded in process task.

The system process task information are some information necessarily corresponding to each system process. In order to be distinguished from the user connection information, such corresponding information is divided into different system information according to different purposes. Each system information also corresponds to one process task, and only the information with the process task is executed by the process.

The task stack information module includes tasks required to be executed, and each task required to be executed can be executed by one process task necessarily. These process tasks mainly save corresponding stack information, register information and other process execution state information. The process task can be executed on any process, the process can load the process task, and switching between the plurality of process tasks can also be performed. A very special idle task exists among these process tasks, and this task enters a sleep state directly without performing any operation. The special idle task is mainly configured to be used when the system is in an idle state.

Preferably, the shared information required by each process saved in the shared cache module is loaded when the system is activated, and is identical to information in a storage layer during an execution of the system, so that the latest and consistent result is obtained when each process is executed.

The system process task information can be divided into different system information according to different purposes, that is, the system process task information includes at least lock processing system information, resource cleaning system information, network processing system information and other system information.

The system process unit includes a connection processing process, an execution process, a distributed transaction processing process and a network connection process. Each process in the system process unit loads and executes the process task in the task stack information module, or performs a switching between the plurality of process tasks. Specifically, the connection processing process is configured to execute a query request, an insert request, an update request and a delete request sent by a client. The execution process is configured to execute a concurrent execution process task derived from the connection processing process. The distributed transaction processing process is configured to execute a distributed transaction processing task, and the network connection process is configured to execute a network connection task.

To be precise, the connection processing process mainly executes user requests such as a query request, an insert request, an update request and a delete request sent by the user. The connection processing process selects a process task related to user connection from the process tasks to execute. If it is found that the process has to enter a waiting state during execution, the process automatically abandons the task and selects other executable tasks from the process tasks to continue execution.

The execution process is specifically configured to execute concurrent execution process tasks derived from the connection processing process. The priorities of these tasks are often relatively high, and thus these tasks are executed by using a separate process, to prevent the problem that the response to a user query request is slow caused by an excessively high number of user connections.

Additionally, the distributed transaction processing process, the network connection process and other processing processes are collectively referred to as other system processes. System tasks should be processed in time, and thus all system tasks are executed by using independent processes to avoid performance problems caused by slow response to system tasks.

In the present embodiment, the number of user connections in the database node architecture does not have a corresponding relationship with the number of processes or threads. The number of processes or threads of the entire node does not increase as the number of user connections increases. In extreme cases, in order to support thousands of connections, the architecture only needs to activate one connection processing process, but the response time to each connection will be affected, nothing more. However, the traditional multi-process or multi-thread architecture cannot achieve this. The number of processes or threads activated by the traditional architecture increases as the number of user connections increases. And according to the inventor's experiment, one connection of the architecture only occupies a block of 10 MB of memory. Based on the current common machine configuration, it is estimated that tens of thousands of connections can be supported when a single node exceeds 10 GB of memory. Especially, most connections are just created, without actual database query or operation, and thus the advantages of the architecture of the present invention are more obvious.

Figure 2:
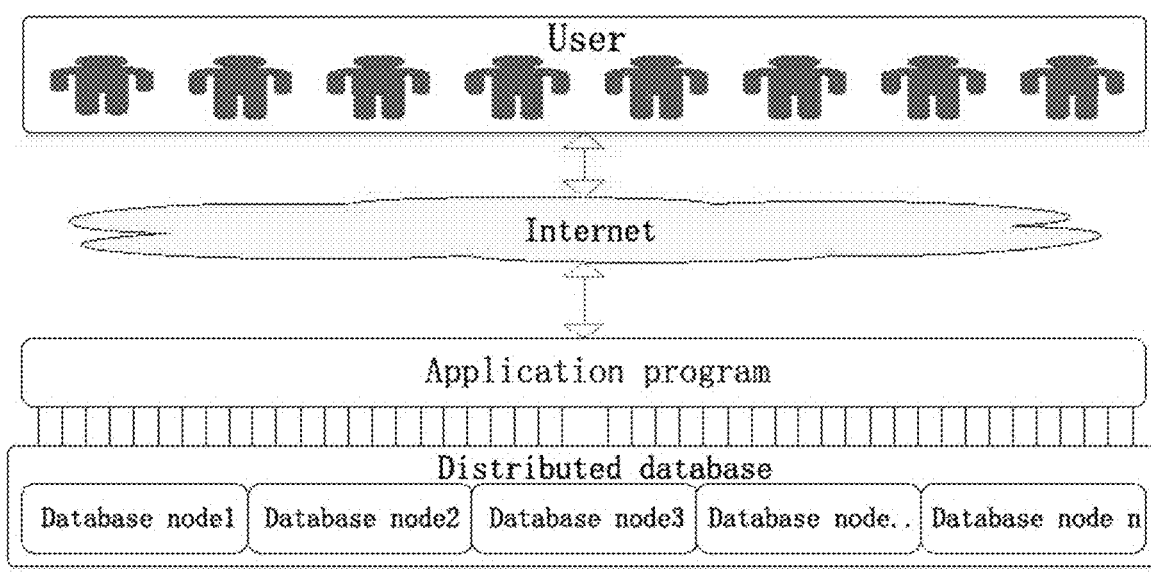
FIG. 2 is a block diagram for explaining a system architecture according to another embodiment of the present invention.

As shown in FIG. 2, in a typical application example of the present invention, a plurality of distributed database nodes are designed in the architecture of the present invention. An internal architecture of each distributed database node is identical, and the system shared memory unit of each distributed database node is allocated and used uniformly by the system.

Another embodiment of the present invention is a method for implementing the distributed database architecture based on shared memory and multi-process in the above embodiment, and the method includes the following steps.

Step S1: a system is activated; after the system is activated, all global variables are first initialized, and then the system shared memory unit in the distributed database node, namely a shared memory required for activating the system, is allocated and initialized; all user connection information and system process task information in the system shared memory unit, stack information and register information in the process task, and information in the shared cache module are mainly initialized; before an activation is performed on the shared memory required by the system, a state of the shared memory is first checked, and if the memory is already allocated, errors of the system and the activation are reported.

After the system is initialized, the relevant process specified by the user configuration parameter is activated.

Step S2: each process in the system process unit obtains the process task required to be executed from the task stack information module, and if no task is obtained, an idle task is executed.

When a client initiates a connection request, the connection processing process in the system process unit receives and responds to the user request. The connection processing process generates a process task corresponding to the current user request and puts the process task corresponding to the current user request into all user connection information in the shared memory.

In this step, if the user initiates a client connection request, the connection processing process creates user connection information and associates the user connection information with one process task, and then put the generated process task into all user connection information. If the user initiates a client query request, the connection processing process adds query request information to the user connection information associated with the corresponding process task.

Step S3: when any one process in the system process unit executes any one process task in the task stack information module, a blocking wait, such as a wait for receiving information or a wait for that I/O is completed, occurs, and the current process abandons an execution of a current process task, and hand over the process task to a background process for asynchronous wait.

In the method described in the present embodiment, the following steps can also be continued.

Step S4: each process in the system process unit cyclically obtains and executes the process task from the task stack information module; when the process task with user information is executed, the user information is further checked whether to be a user connection request; if the user information is the user connection request, the connection processing process executes a flow related to a connection creating and creates user connection information; if the user information is user query information, the execution process obtains a user query statement from the user information and executes a a related query. If the query is high in the cost and can be executed concurrently, then process tasks with interdependencies are created, thereby triggering the execution of the execution process.

Step S5: when the system is shut down, all processing processes are first shut down, and then one process is configured to release shared memory resource of the system shared memory unit of each distributed database node.

Based on the above embodiments of the present invention, the technical solution of the present invention also has the following characteristics:

1) the shared memory technology and the multi-process task processing mechanism are adopted;
2) process execution is task-oriented;
3) user connections are managed by the shared memory;
4) the shared memory is used as the main cache memory;
5) when a user does not execute a statement, the process resource is not occupied;
6) any process can handle any user connection in like manner;
7) multiple processes share a piece of cached data; and
8) the occupied CPU resources can be effectively controlled by configuring the number of processes.

In actual use of one of the above preferred embodiments of the present invention, as shown in FIG. 2, the aforementioned distributed database node serves as a node of the distributed database, receives and executes a user request from Internet through a system application program by the implementation method mentioned above, and the shared memory of each distributed database node is uniformly called and activated by the system.

In addition to the above description, it should be noted that the expressions "an embodiment," "another embodiment," "embodiment," etc., refer to the specific features, structures, or features described in conjunction with the embodiment are included in at least one embodiment generally described in the present invention. An identical expression occurring in a plurality of places in the specification does not necessarily refer to the identical embodiment. Furthermore, when describing a specific feature, structure or characteristic in combination with any embodiment, what is claimed is that such characteristic, structure or characteristic implemented in combination with other embodiments shall fall within the scope of the present invention.

Although the present invention has been described with reference to a number of explanatory embodiments of the present invention, it should be understood that many other modifications and embodiments can be devised by those skilled in the art, and these modifications and embodiments shall fall within the scope and spirit of the principles of the present invention. More specifically, within the scope of the specification, drawings and claims of the present invention, various modifications and improvements can be made to the component parts and/or layout of the combination layout; in addition to the modification and improvement of the component parts and/or the layout, other uses are also obvious to those skilled in the art.

What is claimed is:

1. A distributed database architecture based on shared memory and multi-process, comprising a distributed database node; wherein,
   a system shared memory unit and a system process unit are built in a distributed database;
   the system shared memory unit comprises a task stack information module and a shared cache module; wherein
      a plurality of process tasks are built in the task stack information module;
      the plurality of process tasks comprise a plurality of system information with a plurality of purposes in system process task information, and each system information of the plurality of system information corresponds to one process task of the plurality of process tasks; the each system information further comprises process tasks associated with all user connection information;
      each process task of the plurality of process tasks comprises stack information and register information corresponding to the stack information;
      the shared cache module is configured to save a plurality of connections of the distributed database node, or shared information required by each process;
   the system process unit comprises a connection processing process, an execution process, a distributed transaction processing process and a network connection process; wherein
      the each process in the system process unit loads and executes the each process task in the task stack information module, or performs a switching between the plurality of process tasks; wherein
      the connection processing process is configured to execute a query request, an insert request, an update request and a delete request sent by a client;
      the execution process is configured to execute a concurrent execution process task derived from the connection processing process;
      the distributed transaction processing process is configured to execute a distributed transaction processing task; and
      the network connection process is configured to execute a network connection task.

2. The distributed database architecture of claim 1, wherein, a plurality of distributed database nodes are arranged; an internal architecture of each distributed database node of the plurality of distributed database nodes is identical, and the system shared memory unit of the each distributed database node is allocated and used uniformly by a system.

3. The distributed database architecture of claim 1, wherein, the system process task information is divided into the plurality of system information according to the plurality of purposes, and the system process task information comprises lock processing system information, resource cleaning system information and network processing system information.

4. The distributed database architecture of claim 1, wherein, the shared information required by the each process saved in the shared cache module comprises a data dictionary, a configuration parameter, a query plan, a query result, an execution state and stored data.

5. The distributed database architecture of claim 1, wherein, the shared information required by the each process saved in the shared cache module is loaded when a system is activated, and the shared information is identical to information in a storage layer during an execution of the system.

6. A method for implementing the distributed database architecture of claim 1, comprising the following steps:
step A: performing an activation on a system, allocating and initializing the system shared memory unit in the distributed database node, and initializing all user connection information and the system process task information in the system shared memory unit, the stack information and the register information in the process task, and information in the shared cache module; when a memory is already allocated at this time, reporting errors of the system and the activation;
step B: obtaining the process task required to be executed from the task stack information module by the each process in the system process unit, and when no task is obtained, executing an idle task;
when the client initiates a connection request, receiving and responding to the connection request by the connection processing process in the system process unit, generating the process task corresponding to the connection request by the connection processing process and putting the process task corresponding to the connection request into all user connection information in the system shared memory unit; and
step C: when any one process in the system process unit executes any one process task in the task stack information module, a blocking wait occurring, and abandoning, by a current process, an execution of a current process task and handing over the current process task to a background process for asynchronous wait.

7. The method of claim 6, wherein, in the step B, when a user initiates a client connection request, the connection processing process creates user connection information and generates the process task associated with the user connection information, and then puts the process task associated with the user connection information into all user connection information; when the user initiates a client query request, the connection processing process adds query request information to user connection information associated with a process task corresponding to the client query request.

8. The method of claim 6, further comprising:
step D: cyclically obtaining and executing the process task from the task stack information module by the each process in the system process unit; when the process task with user information is executed, further checking whether the user information is a user connection request, and when the user information is the user connection request, executing, by the connection processing process, a flow related to a connection creating, and creating user connection information; when the user information is user query information, obtaining, by the execution process, a user query statement from the user information and executing a query related to the user query information.

9. The method of claim 6, further comprising:
step E: when the system is shut down, first shutting down all processing processes, and then releasing shared memory resource of the system shared memory unit of each distributed database node by one process.

10. The distributed database architecture of claim 4, wherein, the shared information required by the each process saved in the shared cache module is loaded when the system is activated, and the shared information is identical to information in a storage layer during an execution of the system.

11. The method of claim 6, wherein, a plurality of distributed database nodes are arranged; an internal architecture of each distributed database node of the plurality of distributed database nodes is identical, and the system shared memory unit of the each distributed database node is allocated and used uniformly by a system.

12. The method of claim 6, wherein, the system process task information is divided into the plurality of system information according to the plurality of purposes, and the system process task information comprises lock processing system information, resource cleaning system information and network processing system information.

13. The method of claim 6, wherein, the shared information required by the each process saved in the shared cache module comprises a data dictionary, a configuration parameter, a query plan, a query result, an execution state and stored data.

14. The method of claim 6, wherein, the shared information required by the each process saved in the shared cache module is loaded when the system is activated, and the shared information is identical to information in a storage layer during an execution of the system.

15. The method of claim 8, further comprising:
step E: when the system is shut down, first shutting down all processing processes, and then releasing shared memory resource of the system shared memory unit of each distributed database node by one process.

* * * * *